United States Patent [19]

Reichl et al.

[11] Patent Number: 4,616,841
[45] Date of Patent: Oct. 14, 1986

[54] BUCKLING CONTROL SYSTEM FOR ARTICULATED VEHICLES

[75] Inventors: Bernhard Reichl, Stuttgart; Rudolf Maurath, Esslingen; Dieter Koch, Aichwald; Gerhard Hametner, Unterensingen, all of Fed. Rep. of Germany

[73] Assignee: Daimler-Benz Aktiengesellschaft, Stuttgart, Fed. Rep. of Germany

[21] Appl. No.: 581,099

[22] Filed: Feb. 17, 1984

[30] Foreign Application Priority Data

Feb. 19, 1983 [DE] Fed. Rep. of Germany ....... 3305751

[51] Int. Cl.[4] ............................................. B62D 53/06
[52] U.S. Cl. ................................. 280/432; 280/446 B
[58] Field of Search .................... 280/432, 403, 446 B, 280/474; 180/143, 142, 141, 139, 136; 364/424, 425

[56] References Cited

U.S. PATENT DOCUMENTS

| 3,894,773 | 7/1975 | Cleveland et al. | 280/432 X |
| 4,106,792 | 8/1978 | Schultz et al. | 280/432 |
| 4,313,616 | 2/1982 | Howard | 280/432 X |
| 4,399,884 | 8/1983 | Vandehey | 180/141 X |
| 4,482,165 | 11/1984 | Dawson et al. | 280/403 X |
| 4,487,425 | 12/1984 | Taylor | 280/432 |

FOREIGN PATENT DOCUMENTS

2207063 8/1972 Fed. Rep. of Germany ...... 280/432

Primary Examiner—John J. Love
Assistant Examiner—Charles R. Watts
Attorney, Agent, or Firm—Barnes & Thornburg

[57] ABSTRACT

A buckling protection control system for articulated vehicles, especially for articulated buses is disclosed. Double acting piston cylinder units are interposed between vehicular sections at the hinged connection therebetween to forceably dampen and control the relative angular movement of the vehicular sections during driving of the vehicle. In addition to controlling the buckling movements during proper driver operation of the vehicle, the control system of the invention includes an arrangement for responding to situations where a driver, as a result of a panic reaction, sharply or rapidly steers the vehicle. For this purpose, the invention includes a computer control system which determines a maximum buckling angle value K-max(V) which is dependent on the vehicle velocity V. Irrespective of other driving conditions, the buckling angle is prevented from exceeding this maximum buckling angle K-max(V).

13 Claims, 8 Drawing Figures

BUCKLING CONTROL SYSTEM FOR ARTICULATED VEHICLES

BACKGROUND AND SUMMARY OF THE INVENTION

The invention relates to a buckling control system for steerable articulated vehicles, especially articulated busses. Such vehicles include a forward steerable wagon or vehicular section and at least one following wagon or vehicular section connected thereto by a pivotal connection. The buckling control system includes devices effective to forceably counteract enlargements and also reductions in the buckling angle between the vehicular sections. A computer control system is provided which either (i) determines an adjustable desired value or desired value range for a buckling angle corresponding to extensively skid-free vehicle drive, this determination being made in dependence upon the actual turning angle of the forward vehicular section and the preceeding travel path of the vehicle, with the control device being operated to apply counter forces against further increases in the buckling angle during increasing deviations between the actual value of the buckling angle and the determined desired angle/desired angle region of the buckling angle;

or (ii) determines a maximum value of the buckling angle based upon the turning angle corresponding to an essentially skid-free drive corresponding to essentially pure circular drive at that angle, and applying buckling angle control forces against tendencies to exceed this determined maximum buckling angle.

A control system corresponding to the first above mentioned alternative control arrangement is described in a not published German patent application P No. 32 30 617.2. This arrangement has the advantage that the deviations between the actual value and the desired value of the buckling angle as a rule can be held in a relatively narrow range which through corresponding control of the hinge blocking arrangement only permits such buckling angle changes which bring about an approach of the actual value and the desired value. However, if the driver turns the steering system too sharply, for the vehicle driving speed with a resultant excessive turning angle that no longer permits skid-free drive, the computer control hinge blocking mechanism will seek to have the actual value of the buckling angle approach the desired value, a condition which will then make the already critical driving condition even more dangerous. Namely, the computer calculates by increasing turning angle an increasing desired value of the buckling angle so that finally an unsuitably strong buckling is permitted.

An arrangement corresponding to the second abovementioned alternative control system is shown in German published examined application (DE-AS) No. 24 20 203. In this type of arrangement, the permitted buckling angle for the control arrangement is only limited at a value which corresponds to an essentially skid-free pure circular travel path of the vehicle at the given turning angle of the forward vehicular section and the given velocity. However, here also the control system permits too much buckling of the vehicle under certain circumstances if the steering linkage is too rapidly turned considering the vehicle velocity and a corresponding further skid-free drive is no longer resultant.

This problem was not really recognized prior to the present invention. Also the following cited publications give no hint of this problem or the solution thereof.

From German published unexamined application (DE-OS) No. 29 35 437 it is only shown that, with a slippery road path, the increase in the buckling angle above a certain predetermined value based upon the selected turning angle should be prevented and centrifigal movements as well as oscillating motions of the following wagon or vehicular section should be damped in each driving condition to a tolerable level.

In German published unexamined application (DE-OS) No. 30 04 409 there is proposed a velocity dependent damping of the buckling angle changes, so that certainly the buckling angle change of velocity is reduced, without however immediately influencing the maximum value of the buckling angle.

In view of the above-indicated state of the technology, it is an object of the invention to create a buckling control system which also improves the controllability of an articulated vehicle in the cases when the driver, for example as a panic reaction, turns the steering system excessively fast.

These problems are thereby solved by the invention in that the computer control system determines velocity dependent buckling angle limiting values which can be adjusted for maximum buckling angle still assuring essentially skid-free travel and the hinged or buckling connection is controlled in such a manner that forces are applied against the exceeding of this buckling angle limited value.

The invention is based upon the general concept of limiting the buckling angle below velocity dependent limiting values. This is done independently of which turning angle and which travel path dependent desired values, respectively which turning angle dependent maximum values of the buckling angle, are calculated without considering whether with the respective turning angle and the respective velocity there is still any essentially skid-free driving condition available. Through the invention it is achieved that the buckling angle also can not increase further if the steering linkage by already excessively strong sliding is further turned.

Independently of the manner of control of the blocking control at the hinged articulated connection, it is useful to provide an arrangement for computer controlled damping units that are dependent upon the vehicle velocity and increase the damping of buckling angle changes with increasing vehicle velocity. With such arrangements, according to a preferred embodiment of the invention, it is provided that the damping for changing stable forward driving conditions, with an essentially skid-free drive through curves with changing turning and/or buckling angles, is decreased the greater the difference between the actual value of the buckling value and the maximum permitted value. In this manner it is achieved that the buckling connection can be adjusted in the respective correct direction without force. This is especially of significance for city travel when the vehicle for example, must turn around street crossings and furthermore curves with very small radii.

Further objects, features, and advantages of the present invention will become more apparent from the following description when taken with the accompanying drawings which show, for purposes of illustration only,

DETAILED DESCRIPTION OF THE DRAWINGS

In the drawings and the following description, the vehicular sections 1 and 2 are only schematically depicted in order not to obscure the present invention. By way of background information, reference is made to U.S. Pat. Nos. 4,106,792; 4,313,615; and 4,366,966 for disclosures of an exemplary articulated vehicle which the present invention relates to.

Figure 1:
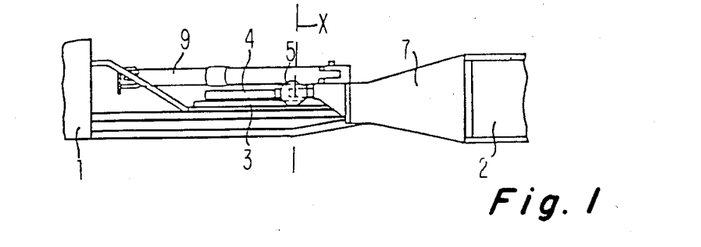
FIG. 1 is a schematic side view showing a hinged connection between a forward and following vehicular unit constructed in accordance with a preferred embodiment of the present invention.
Figure 2:
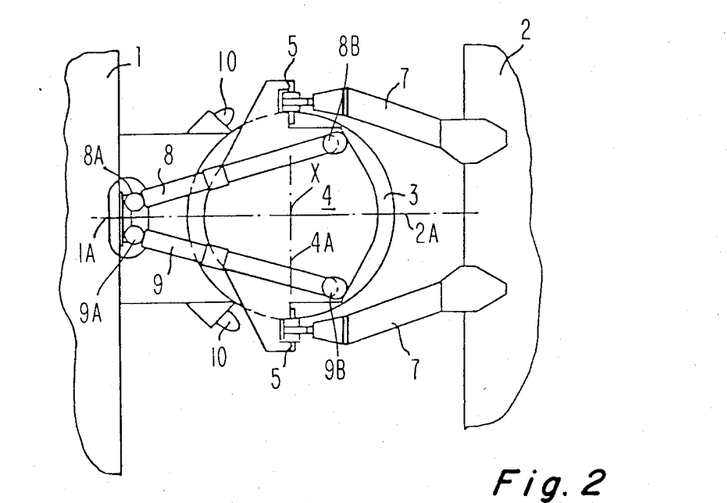
FIG. 2 is a schematic top view of the hinged connection of FIG. 1, showing the vehicular units in a non-buckled straight driving condition.
Figure 3:
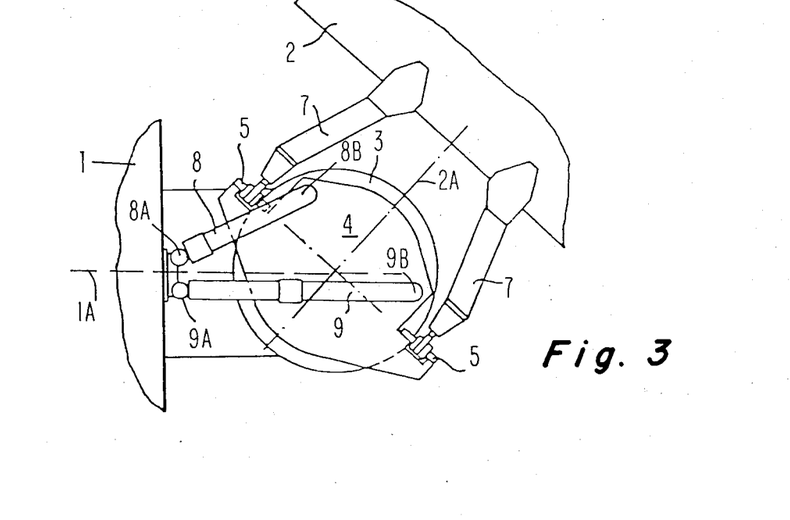
FIG. 3 is a schematic top view similar to FIG. 2, but showing the vehicular units pivoted at an angle with respect to one another.

FIGS. 1 to 3 schematically depict the hinged connection between a forward vehicular unit 1 (e.g., a four wheel bus unit having front steerable wheels) and a following vehicle unit 2 (e.g. a trailing wheeled bus section). A rotary plate or table 3 is fixedly connected to the unit 1 and forms a pivot support for cross piece 4 to pivotally move about a vertically extending buckling pivot axis X. Cross piece 4 is in turn hingedly connected at joints 5 with connecting support arms 7 connected with the frame of the following vehicle unit 2. The following unit 2 is supported in the driving direction by means of these support arms 7 connected at the cross piece 4. In the FIG. 2 illustration, the vehicular units 1 and 2 are disposed in a straight line driving condition, with their respective longitudinal axes 1A and 2A coinciding with one another. The hinged connections 5 are disposed along a cross axis 4A of the cross piece 4 extending through the hinged or buckling pivot axis X. The support arms 7 are disposed symmetrically at opposite sides of the longitudinal axis 2A of the unit 2.

Two piston-cylinder units 8 and 9 are provided for applying support forces against buckling pivoting movement of units 1 and 2 during driving conditions. These piston-cylinder units 8 and 9 are disposed symmetrically with respect to the vehicle longitudinal axis (1A, 2A) when the vehicle is in a straight ahead, non-buckled position of the units 1 and 2. Piston-cylinder unit 8 is connected by means of hinged connection 8A at the unit 1 and at the cross piece 4 at connection 8B. In a similar manner, piston-cylinder unit 9 is connected at the unit 1 via articulated connection 9A and at the carrier 4 by articulated connection 9B. The connection points 8A, 9A are disposed closely adjacent one another and the connection points 8B, 9B are spaced from one another at opposite lateral sides of the longitudinal axis 2A of the unit 2 and cross piece 4 so as to form a V-shaped configuration as seen in the top view when in the straight ahead driving condition of FIG. 2. The piston-cylinder units 8 and 9 are arranged with their axes parallel to the plane of the rotary pivot support plate 3 so that the piston-cylinder units 8 and 9 exerts substantially no forces at the cross piece 4 having components perpendicular to the plane of the rotary support plate 3.

The piston-cylinder units 8 and 9 form a part of an articulated interlock system explained in more detail below, for the articulated connection between the forward vehicular unit 1 and the following vehicular unit 2 formed by the rotary support plate 3 and the cross piece 4.

The maximum achievable buckling angle for this articulated connection (rotary support plate 3 and cross piece 4) is limited only by means of the elastic bumpers 10 arranged at the rotary support plate 3 (see the illustration in FIG. 2) or at a frame fixedly connected with the rotary plate 3, which elastic bumpers cooperate with corresponding abuttments at cross piece 4.

Figure 4:
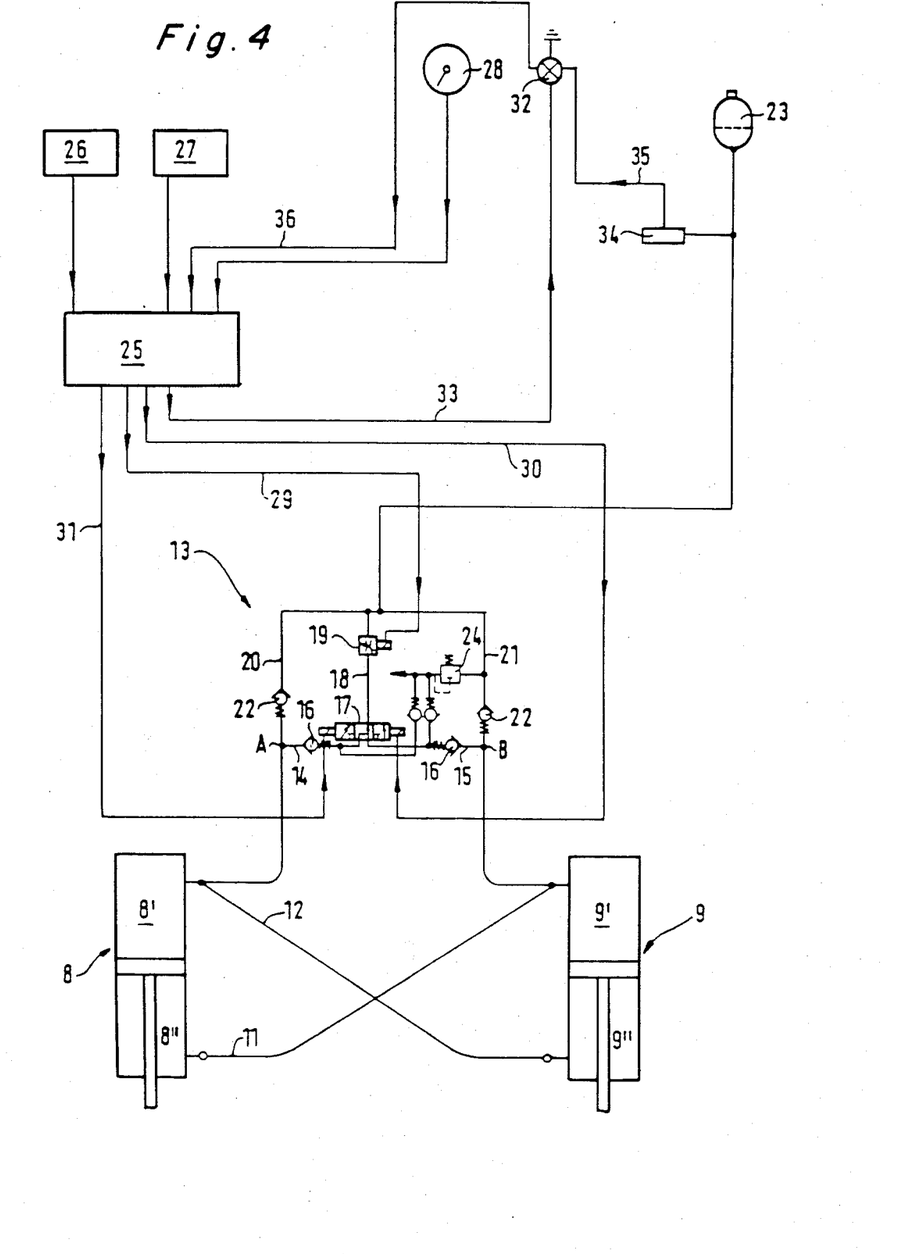
FIG. 4 is a schematic diagram showing the electrical and hydraulic circuits for controlling the piston-cylinder units at the hinged connection, constructed in accordance with a preferred embodiment of the invention.

Referring to FIG. 4, the piston-cylinder units 8 and 9 are constructed as double acting units having respective chambers 8', 8'' at the opposite sides of pistion 8P and chambers 9', 9'' at opposite sides of piston 9P.

The chambers 8', 8'', 9', 9'' are cross connected as shown in FIG. 4 by means of connecting lines 11 and 12. A fluid control circuit 13 is interposed between the two lines 11 and 12 to control the emission and throttling of the exchange of fluid in these lines and the corresponding chamber 9', 8'', 8', 9''. With this arrangement, hydraulic medium is selectively applied to the piston-cylinder units so that when line 11 is pressurized, piston-cylinder unit 9 is lengthened and piston-cylinder unit 8 is shortened by the application of the pressures to the respective chambers 9', 8'' and the exhausting of the pressure at the respective opposite sides of these piston-cylinder units via line 12. A corresponding reverse movement of the piston-cylinder units is accomplished by the application of pressure to line 12 and the exhaustion of the pressure in line 11.

The control system circuit 13 includes a connection A communicating with line 12 as well as a connection B communicating with line 11. Respective inlet lines 14, 15 extend from the connections A and B, under interposition of non-return check valves 16 to prevent return flow in the direction of the connections A and B to the inlet side of an electrically actuable blocking and control organ 17. In the position illustrated in FIG. 4, organ 17 is not activated and is disposed in a middle position communicating both inlet lines 14 and 15 with an outlet line 18.

When organ 17 is disposed in its rightward end position, it connects only the inlet line 14 with the outlet line 18, while the inlet line 15 is blocked. In a corresponding manner, when control organ 17 is in its left end position, the inlet line 15 is connected with the outlet line 18 and simultaneously the inlet line 14 is blocked.

The outlet line 18 leads to an electrically controllable hydraulic throttle device 19, behind which the outlet line 18 branches into branch lines 20 and 21, which under interposition of non-return valves 22, which block in the direction of the throttle device 19, are connected with the connections A and B. Between the non-return valves 22 and the throttle 19 there is connected a high pressure source storage tank 23, which tank 23 can receive and supply fluid such as hydraulic medium.

To prevent a disturbing over pressure, the inlet lines 14 and 15 are respectively connected with an overpressure protection valve 24 between the inlet side of the control organ 17 and the return valve 16.

The blocking and control organ 17 as well as the throttle device 19 are controlled by means of a computer 25 which is supplied with a first signal from a detector 26 which detects the instantaneous turning angle of the steered wheels of the forward vehicular unit 1, a signal from the detector 27 for detecting the instantaneous buckling or pivot angle of the joint ¾ between the forward and following units 1, 2, and a signal corresponding to the instantaneous velocity via the schematically depicted tacometer 28.

The computer control apparatus 25 adjusts the throttle device 19 by means of the schematically depicted signal line 29 in such a manner that with increasing vehicle velocity there is an increase in the throttling and with a decrease in velocity there is a decrease in the throttling effect.

The computer apparatus 25 further adjusts the position of the organ 17 via the schematically indicated control lines 30, 31 toward the left and right in dependance upon the instantaneous values received from unit 26 for the forward vehicle unit steering angle and from unit 27 depicting the buckling angle of the two units with respect to one another. In preferred embodiments, the lines 30 and 31 supply current to activate a solenoid coil or the like to move the organ 17 to the desired position. If neither of the control lines 30 and 31 are excited by the computer unit 25, the organ 17 assumes the middle position illustrated in FIG. 4, for example, return springs could be provided to return the organ 17 to the middle position in the absence of the excitation of the lines 30 or 31.

With the organ 17 in the illustrated position, the computer unit 25 controls the adjustment of the throttle device 19 so that the piston-cylinder units 8 and 9 resist the buckling moment of the vehicular units 1 and 2 in both directions, with the level of resistance being dependent upon the adjustment position of the throttle device 19. In this manner, the following vehicular unit 2 can pivot with respect to the front or forward unit 1 in both directions against damping forces applied by the piston-cylinder units 8, 9. If now the control line 30 is activated, the organ 17 is shoved toward the right so that the following vehicular unit 2 can further buckle or pivot with respect to the forward unit 1 only in one direction because then the piston of the pistons 8P is movable into its cylinder only with a simultaneous outward movement of the piston 9P. In a corresponding manner, when the control unit 25 activates the control line 31 and thereby brings the organ 17 to its left hand end position, the piston 9P can only be moved inwardly in its cylinder under a simultaneous corresponding outward movement of the piston 8P. In this way, upon activation of the control line 30 the following vehicular unit 2 can pivot further with respect to the front vehicular unit 1 toward the right, while with activation of the control line 31 only a pivoting toward the left is possible. The relative pivotal movement in the respective other direction via the articulation ¾ between the front and rear following vehicular units 1 and 2 is effectively blocked. In both cases the buckling or pivoting in a permitted direction is against a respective resistance determined by the throttling device 19.

The control unit 25 includes a failure recognition logic which cuts off the current to both control lines 30 and 31 upon the occurrence of a failure so that the organ 17 is then brought to its middle position. Simultaneously, a control lamp 32 is switched on via a control line 33. A pressure detector 34 is provided for monitoring the pressure in the hydraulic fluid system and, upon the detection of a pressure failure in the system sends a signal turning on the control lamp 32 via control line 35 and simultaneously sends a corresponding signal to the inlet line 36 of the computer control unit 25.

Figure 5:
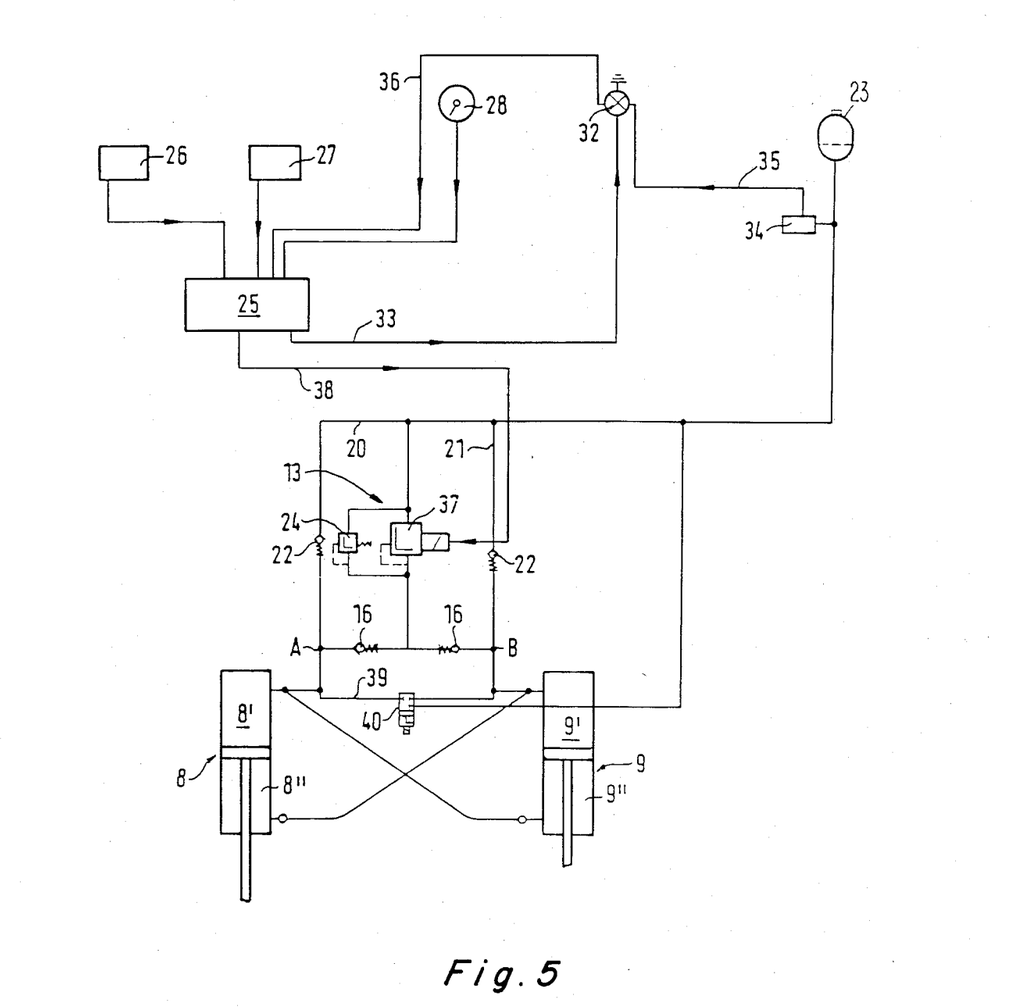
FIG. 5 is a diagram similar to FIG. 4 showing an alternative preferred embodiment of the invention.

In the FIG. 5 illustration, corresponding reference numerals are used for corresponding features as in the FIG. 4 arrangement with the above operational description being likewise applicable. The FIG. 5 embodiment differs from the FIG. 4 embodiment in that a control organ 37 is substituted for the combination of the control organ 17 and the throttling device 19 of FIG. 4. The control organ 37 is adjustably movable in a stepless manner between a condition of maximal opening and a condition of complete blocking by means of control line 38 and control device 25.

In the completely blocked condition of the control organ 37, the pistons 8P and 9P are maintained in a relatively fixed position while they can move with respect to one another against more or less strong resistance if the control organ 37 takes a position which is more or less opened. In the cases where the organ 37 is in a more or less open position, a buckling or pivoting movement of the following vehicular unit 2 toward the right or the left with respect to the front vehicular unit 1 is facilitated under correspondingly more or less stronger damping. In the first condition (organ 37 completely blocking the line), the articulation ¾ between the forward unit 1 and the following unit 2 is blocked. In the FIG. 5 arrangement a bypass line 39 is arranged parallel to the inlet lines 14 and 15, the branches of which bypass line 39 are normally separated from one another by means of a blocking organ 40. Upon the occurrence of a failure however, the control unit 25 can actuate the organ 40 (by means of a not illustrated control line) so that the bypass line 39 is opened and simultaneously connected with the storage 23. Under these last mentioned conditions, the pistons 8P and 9P of the piston-cylinder units 8 and 9 are freely movable independently of the position of the control organ 37.

In the arrangement of FIG. 4 and the arrangement of FIG. 5, the control unit 25 can permit or prevent a variable buckling movement of the trailing unit 2 by means of corresponding control of the organ 17, throttling device 19, respectively control organ 37.

In the simplest case, the control unit 25 adjusts the steering angle dependent maximum value of the buckling angle which still provides for skid-free driving of the vehicle during a respective constant turning angle (constant turning angle of the steered wheels of the forward unit 1).

Figure 7:
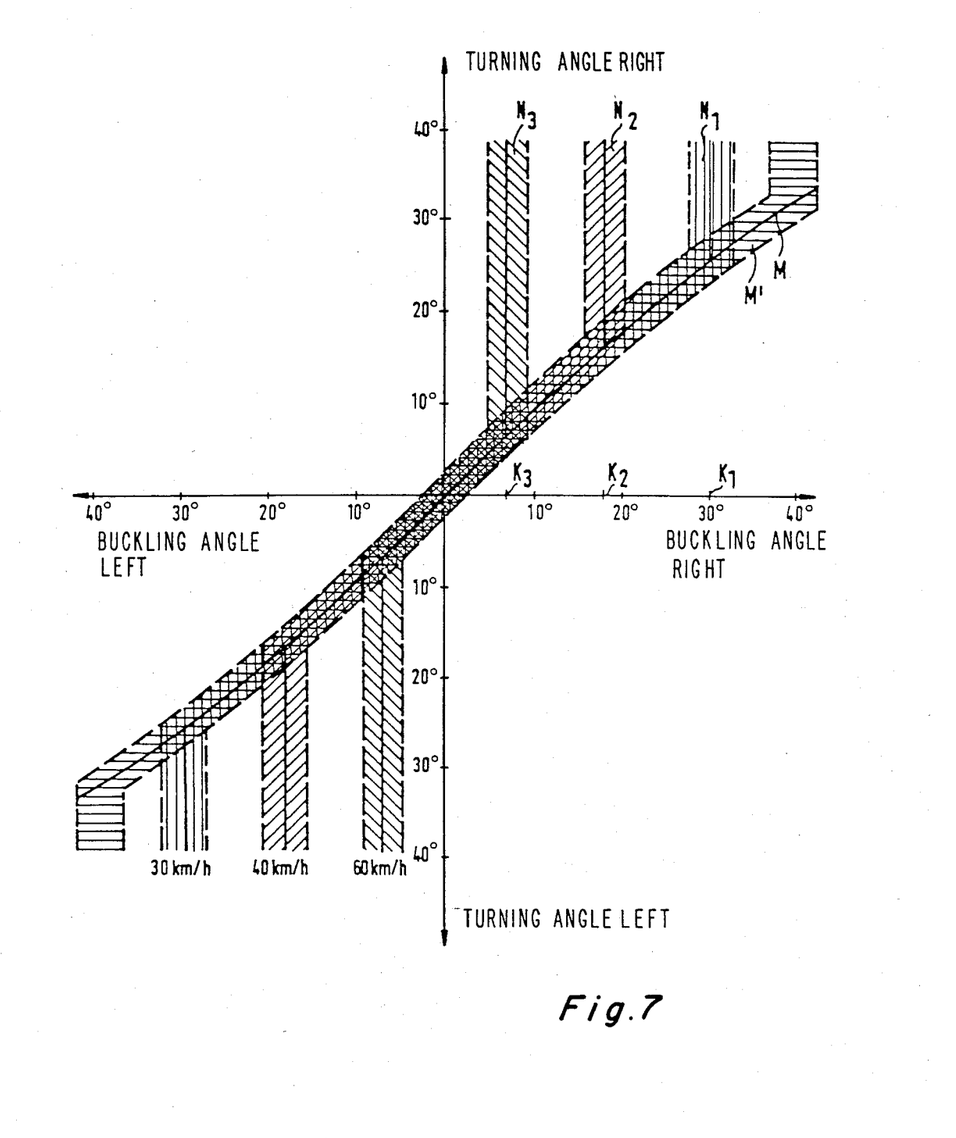
FIG. 7 is a diagram graphically depicting the maximal and limit values of the buckling angle in dependance on the forward vehicle turning angle and/or the vehicle velocity.

FIG. 7 includes a curve M representing the relationship of this maximum value to the steering turning angle. As long as the measured values of the buckling angle and the steering angle is disposed inside of one of the striped shaped regions M' of the curve M, the control unit 25 permits relatively free counter movements of the pistons 8P, 9P of the piston-cylinder units 8, 9, whereby the throttling device 19 or the control organ 37 is adjusted only with increasing velocity in the direction of an increasing throttle effect. Thereby a more or less strong pivoting movement of the following vehicular unit 2 to both sides is facilitated. If the detected values of the steering angle and buckling angle are outside of the region M', the control organ 17 will be adjusted to its right or left position, respectively, the control organ 37 will have its opening adjusted, so that only such movement of the pistons 8A, 9A are permitted wherein the following vehicular unit 2 can pivot exclusively in a single direction, by which the value pair of the turning angle and buckling angle approaches the region M' depicted on graph of FIG. 7.

Figure 6:
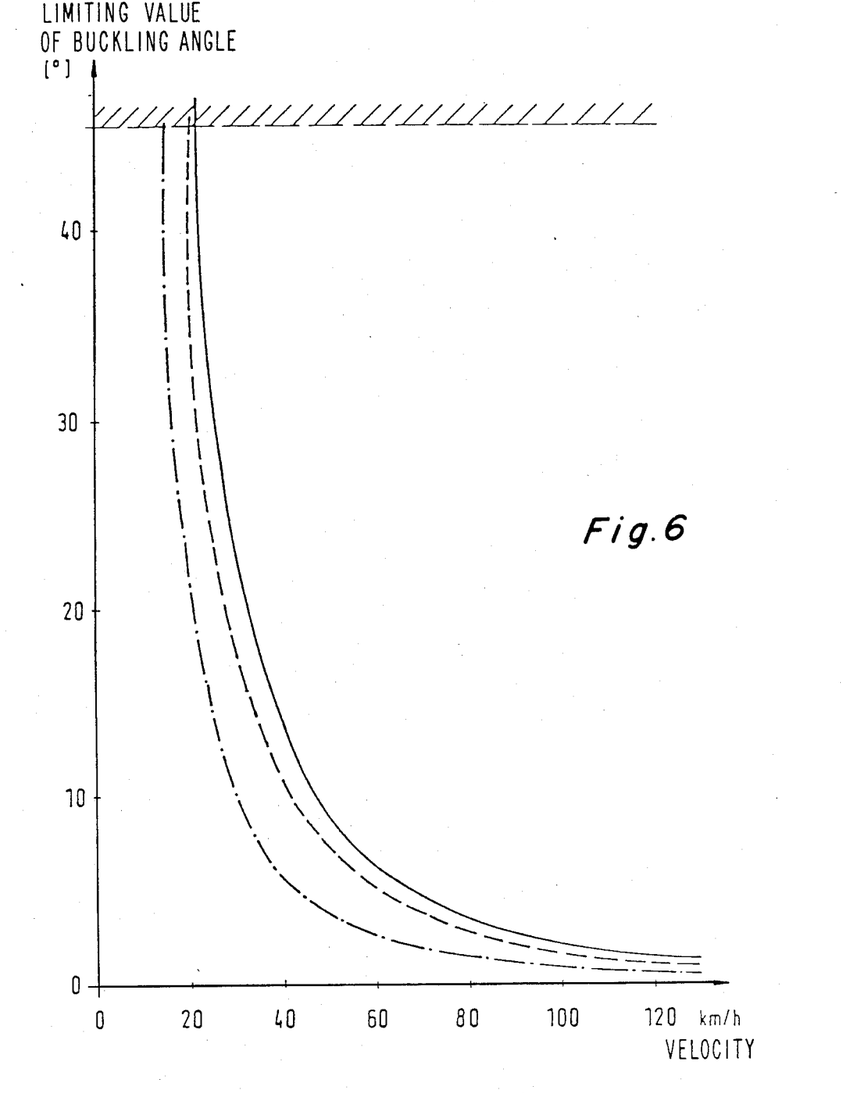
FIG. 6 is a diagram graphically depicting the achievable buckling angles in dependance on the velocity and differently achieved cross acceleration and essentially skid free driving condition.

Because of limitations in the road surface adhesion, a vehicle can be only limitedly accelerated in the cross direction of the vehicle, meaning that sharp curves can only be traveled with reduced velocity while curves with large radii can be traversed at higher velocities. This also means that the measured value of the buckling angle for essentially skid-free driving must be below the velocity dependent limiting value. This is graphically depicted in FIG. 6 for differently achievable cross accelerations. The control unit 25 can consider this information - comparing further with FIG. 7—in that it considers the velocity in permitting buckling movement of the following vehicle unit 2 toward the right or left, if the detected steering angle and buckling angle are disposed with respective velocity inside of the stripe shaped zones $N_1$, $N_2$ respectively $N_3$, whereby the increasing index corresponds to increasing velocity. If the combination of the turning angle and buckling angle values lie outside of these zones, the control unit permits only such buckling movements by means of the corresponding control of the fluid control circuit 13 (compare FIGS. 4 and 5) by which the measured value approaches toward the mentioned zones $N_1$ to $N_3$. Also if the steering, in the case of the zone of $N_2$, is turned more than approximatley 20° toward the right or the left, the computer unit 25 seeks by means of the control circuit 13 to have the following vehicular unit 2 approach a buckling angle which is in the region of the limiting value $K_2$. The corresponding is true for the limiting values $K_1$, respectively $K_3$, if the vehicle travels with the indicated velocities of one of the zones $N_1$, respectively $N_3$.

In an especially advantageous manner the control unit 3 determines from the instantaneous changes of the steering angle as well as the vehicle velocity, respectively, the vehicle velocity changes, a desired value of the buckling angle. This desired buckling angle is adjusted according to the previously traveled path and the steering angle changes whereby the fluid control circuit 13 is activated in such a manner that the following vehicular unit 2 approaches toward the respective desired value of the buckling angle.

Figure 8:
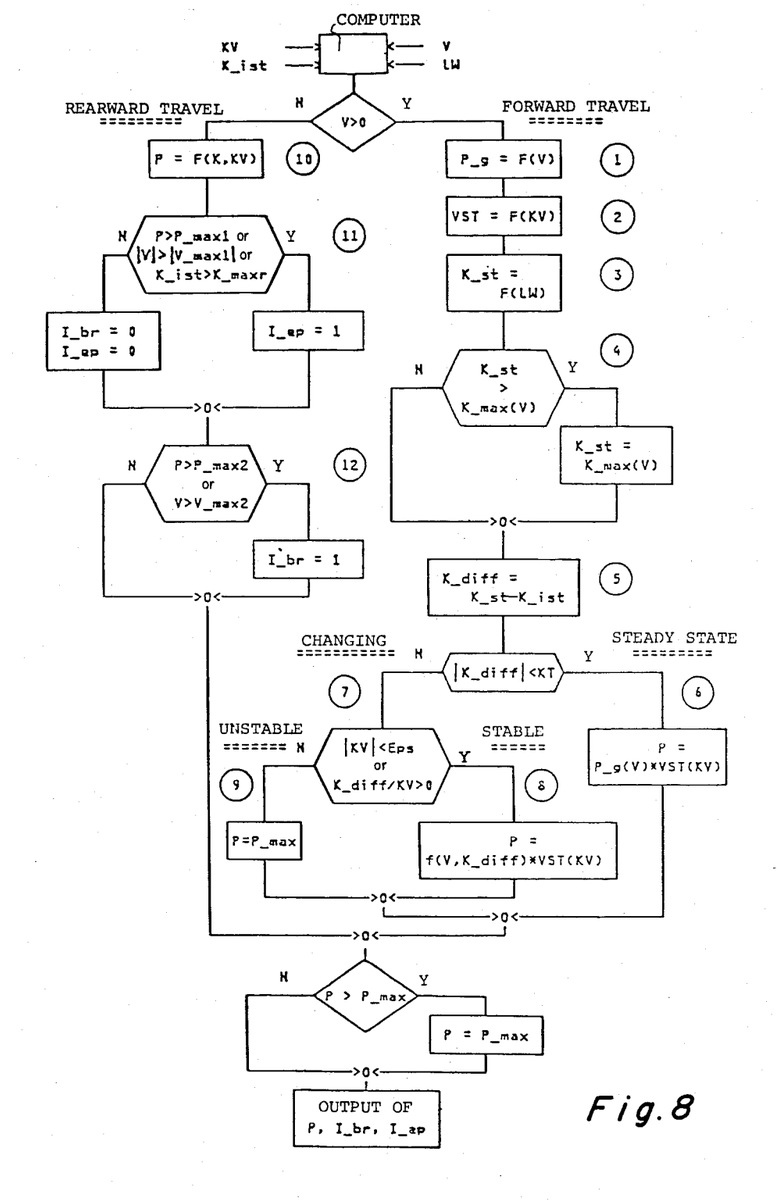
FIG. 8 is a flow diagram depicting the computerized control of the buckling protection system according to a preferred embodiment of the invention.

FIG. 8 shows a flow diagram for the operation of the computerized buckling protection control system according to a preferred embodiment of the invention, with determination of maximal desired buckling angles as a function of the detected steering angle of the forward vehicular section. This maximal buckling angle corresponds to the maximum buckling angle, presuming an essentially circular travel of the vehicle at the detected steering angle, for essentially skid-free driving under the vehicle driving condition.

The computer is connected with sensors which provide input signals representing the velocity (V) of the vehicle (e.g., see tachometer 28 in FIGS. 4 and 5), the turning angle LW (e.g., see detector 26 of FIGS. 4 and 5), the buckling angle change velocity KB (e.g., see detector 27 of FIGS. 4 and 5), and the instantaneous value $K_{ist}$ of the buckling angle.

In the following description, the position numbers encircled in FIG. 8, 1, 2. . . , are referred to as position "1", position "2", etc. so as to distinguish them from any corresponding reference characters in FIGS. 1 through 3. Following is a step by step description of the control process carried out by the computer (compare computer control 25 of FIGS. 4 and 5).

First it is determined whether the velocity of the vehicle is greater than zero or not. If yes (y), this means that the vehicle is travelling forwardly. If the velocity is not above zero and N is displayed or supplied (N=No) and if the velocity has also a negative prefix, this means that the vehicle travels rearwardly.

To begin with, the case of the forward drive will be considered.

According to position "1" of the flow chart, the damping resistance, respectively the damping pressures $P_g$ is adjusted for a fundamental attenuation of the buckling movement of the articulated joint corresponding to a function F(V), supplied for example, by means of a performance characteristic diagram stored in the computer. F(V) is a function of the velocity of the vehicle which, through the computer performance characteristic system provides for increasing damping with increasing velocity V.

Referring to position "2" of the flow chart, the preceeding given fundamental damping attenuation $P_g$ is enhanced by a strengthening factor VST, which factor VST is a function F(KV) of the buckling angle change velocity K with the strengthening factor VST increasing with increased buckling angle change velocity KV according to a predetermined characteristic relationship stored in the computer.

Referring to postion "3" of the flow chart, the computer allots or determines a maximum value $K_{st}$ of the buckling angle as a function F(LW) of the turning angle LW. This maximum value $K_{st}$ of the buckling angle is adjusted for the respective turning angle LW for the conditions of essentially skid-free circular travel of the vehicle.

Then, according to position "4" of the flow chart, the maximum value $K_{st}$ of the buckling angle is examined to determine whether it is larger then the buckling angle limiting value $K_{max}$ (V) which is dependent on the respective vehicle velocity V. This velocity dpendent limiting value $K_{max}(V)$ corresponds in principle to a value of the maximum buckling angle for the respective velocity V where there still will be an essentially skid-free driving condition. This limiting value, which again is stored in the computer in the form of a performance characteristic field or diagram, corresponds to the limiting values of $K_1$, $K_2$ and $K_3$ in FIG. 7.

In case the maximum value of $K_{st}$ is larger than the velocity dependent buckling angle limiting value $K_{max}(V)$, the value of the maximum value $K_{st}$ will subsequently be limited to the value of $K_{max}(V)$. This means that instead of the previously calculated maximum value $K_{st}$, the velocity dependent buckling angle limiting value $K_{max}(V)$ is used.

Then corresponding to position "5" of the flow chart, the buckling angle deviation K—diff, which is the difference between the actual value K—ist and the effective maximum value of K—st (either K—st or K—max(V) described in the immediately preceeding paragraph,) is determined.

Thereafter it is examined whether the absolute value of the buckling angle deviation K—diff is smaller than a permissible buckling angle tolerance KT. If so, there exists a so called steady state driving condition, which within certain tolerances approaches an essentially skid-free circular travel with constant turning angle LW, respectively with only insignificantly changing turning angle LW. In this case, the movements of the buckling connection between the two vehicular sections are simply damped, whereby the strength of the damping P results from the products of the velocity dependent basic attenuation P—g(V) as well as the amplification factor VST (KV) which is dependent upon the buckling angle change velocity KV, as schematically shown at position "6" of the flow chart.

In case the absolute value of the buckling angle deviation K—diff exceeds the buckling angle tolerance KT, there exists a changing or variable driving condition. In this case, according to position "7" of the flow chart, there will be first examined whether the absolute value of the buckling angle change velocity KV is smaller than a threshold value Eps or whether the quotient of the buckling angle deviation K—diff and the buckling angle change velocity KV lies above zero (that means whether this value KV is greater or smaller than zero). The prefix of this last mentioned quotient is positive if the buckling angle is changing in the right direction, based on the corresponding determination of the prefix of the buckling angle deviation and the buckling change velocity.

In case the conditions as set forth in position "7" of the flow chart are existent, there is occurring a changing stable driving condition. This means that the vehicle is travelling through a curve in a normal manner whereby turning angle and/or the buckling angle change. In this case, according to position "8" of the flow chart, simply a damping of movements to the buckling connection is carried out. The strength of the damping P is determined from the product of a function f(V,K—diff) based on the vehicle velocity V and the buckling angle deviation K—diff and the amplification factor VST (KV) which is dependent upon the buckling angle change velocity KV in such a manner that with increasing buckling angle deviation K—diff, damping P is decreased. In this manner, it is assured that the vehicle under normal drive through a curve, and especially with very sharp curves such as must be driven through in city traffic, more or less force free buckling can occur; so a necessary buckling in the course of the driving will inventively be resisted by an especially small damping resistance.

In case one or both of the conditions given under position "7" of flow chart are not fulfilled, there is then existent a nonstable driving condition. This means that the trailing vehicular section or carriage skids to the curve outer side, respectively buckles to the curve inner side. In this case, according to the postion "9" of the flow chart, the damping resistance P is increased to a given design maximum value P—max; resulting in a blocking of the buckling joint with no further buckling movement permitted.

Also during non-stationary stable or stationary driving conditions there can occur dangerous situations through disturbing influences, for example side winds or sporadically slick highways. These situations are, however, controlled, because in this case, suddenly accelerating buckling change velocities KV coresponding to the position "6" and "8" of the flow chart lead to a strong elevation in the calculated damping resistance P and therewith to an amplified damping of the buckling or hinge connection. As necessary, the calculated damping resistance P can climb up to the maximum value P—max so that the buckling joint is momentarily locked. Furthermore, the calculated damping resistance P can actually exceed the maximum value P—max. In this case, however, the actual adjusted damping resistance will be limited to the maximum value P—max, by which already a locking of the buckling joint is obtained.

The entire described process (computer comparison and control functions set forth above) is cyclicly repeated so that the buckling joint functioning corresponding to the different driving situations is more or less strongly damped or blocked as required.

With reverse vehicle drive the movements of the buckling joint are damped with a damping resistance P corresponding to a function F(K, KV) in dependence upon the simultaneous value K—ist as well as the buckling change velocity KV (see position "10" of the flow chart). The computer control system is configured so that the damping is increased with increasing instantaneous values and increasing changing velocity of the buckling angle.

Corresponding to position "11" on the flow chart the computer examines whether the damping resistance P is larger than a given threshold value P—maxl, whether the absolute value of the vehicle velocity V is larger than the absolute value of a velocity threshold value V—maxl or whether the instantaneous value K—ist is larger than a given threshold K—maxR of the buckling angle. The last mentioned value is as a rule so selected that only a comparatively small distance to the maximum possible design buckling angle still remains.

In case at least one of the conditions set forth at position "11" of the flow chart is fulfilled, an impulse I—ep is given off which limits the rotational speed of the driving motor of the vehicle to the idling rotational speed, for example, by influencing the engine injection pump. The vehicle can then only proceed with very low velocity, indpendently of whether the driver activates the gas, pedal in the sense of a velocity increase or not.

In case none of the conditions are fulfilled as set forth in position "11" of the flow chart, there will be neither an impulse I—ep for the injection pump nor an impuse I—br for a holding brake of the vehicle. This means that the driver of the vehicle can intentionally accelerate or brake the vehicle.

Then according to position "12" of the flow chart the computer will determine whether the calculated damping resistance P exceeds a second increased threshold value P—max2 or whether the vehicle velocity V is above a second increased threshold value V—max2. Should one of these conditions be fulfilled, the impulse I—br is created so that the holding brake of the vehicle is forcefully activated and the vehicle is stopped. Further, if the respective calculated damping resistance P reaches or exceeds the maximal value P—max, the buckling joint is blocked.

Through cyclical repeating of the above described processes, during the reverse vehicle driving, the respective adjusting damping values P as well as the respective impulses I—br and I—ep for the holding brake and the motor control (or injection pump) will be continuously supplied to control the vehicle drive, braking, and buckling resistance in dependence on the indicated driving conditions.

The illustrated flow chart of FIG. 8, remains practically unchanged if the inventive buckling protection control system functions according to the first alternative set forth in the introduction of this specification (determination and control of buckling angle as a function of the turning angle LW of the forward vehicle and the preceeding vehicle travel path). In this case the computer must simply calculate the maximum buckling angle K—sas a function of the turning angle LW and the preceeding vehicle travel path. The respective preceeding travel path can be simply calculated from the product of the vehicle velocity V as well as the length of the time interval. Because each computer functions in a given time cycle, the preceeding travel path during a cycle interval can easily be calculated through the multiplication of the vehicle velocity V with a factor which reproduces the similar remaining length of the cycle interval. Therewith the computer can determine the travel path and turning angle dependent desired buckling angle value, by simply comparing the input signals for the vehicle velocity V and the turning angle LW with a desired performance characteristic diagram or curve representing respective predetermined desired buckling angles as a function of V and LW. Furthermore, the flow chart of FIG. 8 must simply consider the maximum buckling angle K—st. The functioning of the computer remains otherwise basically the same as described above for the other alternative buckling angle control arrangments (alternative (ii) set forth in the introduction to the specification).

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Anti-buckling control system for a steerable articulated vehicle of the type having a first steerable vehicular section hingedly connected to a second vehicular section, said first and second vehicular sections being configured to pivot with respect to one another and define a buckling angle therebetween during vehicle travel around curves and the like, said control system comprising:
    buckling angle control device means interposed between the first and second vehicular sections to forceably control the buckling angle therebetween by providing a first resistance against a buckling angle increase,
    vehicle velocity detecting means for detecting the velocity of the vehicle and supplying a vehicle velocity signal, and
    computer control means for controlling the buckling angle control device means, said computer control means including:
        (i) maximum buckling angle determining means for determining a velocity dependent maximum permitted buckling angle as a function of the vehicle velocity, said velocity dependent maximum buckling angle being the maximum buckling angle that will still result in essentially skid-free drive of the vehicle for the associated vehicle velocity, and
        (ii) maximum buckling angle limiting means for controlling the buckling control device means to act against increases in the buckling angle beyond the determined velocity dependent maximum permitted buckling angle by providing a second increased resistance against a buckling angle increase in the buckling control device means only when said buckling angle approaches the velocity dependent maximum permitted buckling angle.

2. Control system according to claim 1, including vehicle steering angle detecting means for detecting the steering angle of the first steerable vehicular section and supplying a vehicle steering angle signal, wherein said computer control means includes:
    (i) means for determining desired buckling angle ranges as a function of the steering angle signal and the preceeding travel path of the vehicle, said desired buckling angle ranges corresponding to essentially skid-free driving of the vehicle, and
    (ii) means for controlling the buckling control device means in the sense of increasing resistance to increasing deviations between the determined desired buckling angle range and the actual buckling angle.

3. Control system according to claim 1, including vehicle steering angle detecting means for detecting the steering angle of the first steerable vehicular section and supplying a vehicle steering angle signal, wherein said computer control means includes:
    (i) means for determining a maximal buckling angle as a function of the steering angle signal presuming an essentially circular travel at the indicated steering angle represented by the steering angle signal, and
    (ii) means for controlling the buckling control device means to act against buckling beyond the maximal buckling angle.

4. Control system according to claim 1, thereby characterized in that a damping arrangement is provided which is responsive to increasing vehicle velocities to increase the damping forces against buckling angle changes.

5. Control system according to claim 4, thereby characterized in that, for at least the rearward drive of the vehicle, the computer control means includes means for controlling the damping devices such that damping forces against buckling angle changes are strengthened under conditions of one of increasing steering angle, steering angle velocity, buckling angle, buckling angle change velocity, and rearward vehicle velocity.

6. Control system according to claim 5, wherein the damping effect during stable forward driving conditions of the vehicle, with essentially skid-free driving through curves, is controlled so that the damping forces are increasingly reduced in response to increase in the difference between the actual value of the buckling angle and the determined permitted maximum buckling angle for the given vehicle velocity.

7. Control system according to claim 6, wherein the computer control means includes means for controlling the buckling control device means in such a manner that the hinged connection is blocked, if the buckling angle change velocity changes so as to exceed a threshold value or if the buckling angle change velocity is increased so as to reduce the difference between the actual value of the buckling angle and the determined permitting maximum buckling angle.

8. Control system according to claim 4, including vehicle steering angle detecting means for detecting the steering angle of the first steerable vehicular section and supplying a vehicle steering angle signal, wherein said computer control means includes:
   (i) means for determining desired buckling angle ranges as a function of the steering angle signal and the preceeding travel path of the vehicle, said desired buckling angle ranges corresponding to essentially skid-free driving of the vehicle, and
   (ii) means for controlling the buckling control device for means in the sense of increasing resistance to increasing deviations between the determined desired buckling angle range and the actual buckling angle.

9. Control system according to claim 4, including vehicle steering angle detecting means for detecting the steering angle of the first steerable vehicular section and supplying a vehicle steering angle signal, wherein said computer control means includes:
   (i) means for determining a maximal buckling angle as a function of the steering angle signal presuming an essentially circular travel at the indicated steering angle represented by the steering angle signal, and
   (ii) means for controlling the buckling control device means to act against buckling beyond the maximal buckling angle.

10. Control system according to claim 7, including vehicle steering angle detecting means for detecting the steering angle of the first steerable vehicular section and supplying a vehicle steering angle signal, wherein said computer control means includes:
    (i) means for determining desired buckling angle ranges as a function of the steering angle signal and the preceeding travel path of the vehicle, said desired buckling angle ranges corresponding to essentially skid-free driving of the vehicle, and
    (ii) means for controlling the buckling control device for means in the sense of increasing resistance to increasing deviations between the determined desired buckling angle range and the actual buckling angle.

11. Control system according to claim 7, including vehicle steering angle detecting means for detecting the steering angle of the first steerable vehicular section and supplying a vehicle steering angle signal, wherein said computer control means includes:
    (i) means for determining a maximal buckling angle as a function of the steering angle signal presuming an essentially circular travel at the indicated steering angle represented by the steering angle signal, and
    (ii) means for controlling the buckling control device means to act against buckling beyond the maximal buckling angle.

12. Control system according to claim 1, wherein said buckling angle control device means includes a pair of double acting fluid medium actuable piston-cylinder units, and wherein said computer control means includes means for controlling the fluid pressure supply to said piston-cylinder units.

13. Control system of claim 12, wherein said buckling angle control device means includes a cross-coupled fluid communication means for communicating fluid medium between said piston-cylinder units, and wherein said computer control means includes blocking means to block said cross-coupled fluid communication means to prevent increases in the buckling angle.

* * * * *